United States Patent
Miyamoto et al.

[11] Patent Number: 5,930,042
[45] Date of Patent: *Jul. 27, 1999

[54] OPTICAL LENS BARREL WITH AN OPTICAL LENS GROUP SHIFTABLE PERPENDICULAR TO AND PARALLEL WITH AN OPTICAL AXIS AND METHOD OF USE

[75] Inventors: Hidenori Miyamoto, Uraysu; Isao Soshi, Tokyo; Minoru Kato; Junichi Omi, both of Kawasaki, all of Japan

[73] Assignee: Nikon Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/352,588

[22] Filed: Dec. 9, 1994

[30] Foreign Application Priority Data

Dec. 14, 1993 [JP] Japan .................................. 5-313714

[51] Int. Cl.$^6$ ............................. G02B 27/64; G03B 17/00
[52] U.S. Cl. ......................... 359/557; 359/554; 396/52; 396/55
[58] Field of Search ...................... 359/554–557, 359/694–706, 813, 814, 823, 824; 354/70, 202, 430; 396/52–55

[56] References Cited

U.S. PATENT DOCUMENTS

| | | |
|---|---|---|
| 4,838,649 | 6/1989 | Ichikawa et al. ........................ 359/813 |
| 5,040,881 | 8/1991 | Tsuji ......................................... 359/557 |
| 5,172,276 | 12/1992 | Ueyama et al. ......................... 359/813 |
| 5,398,132 | 3/1995 | Otani ........................................ 359/557 |
| 5,517,357 | 5/1996 | Shibayama .............................. 359/554 |
| 5,526,192 | 6/1996 | Imura et al. ............................. 359/554 |
| 5,592,335 | 1/1997 | Omi et al. ................................ 396/52 |
| 5,675,445 | 10/1997 | Uemura et al. ......................... 359/554 |
| 5,715,479 | 2/1998 | Katayama et al. ....................... 396/55 |

FOREIGN PATENT DOCUMENTS 107620 4/1993 Japan ................................... 359/554

Primary Examiner—Thong Nguyen

[57] ABSTRACT

An optical lens barrel having a lens group which serves as a vibration compensation lens group and a focusing lens group. The lens group is held by a holder movably secured to a plate. The lens group is movable within the plate on a plane perpendicular to an optical axis of the lens group via a pair of DC motors and associated gear trains. The DC motors and associated gear trains are mounted on the plate. The plate is slidably movable parallel to the optical axis of the lens group by a stepping motor via a series of concentric drive rings disposed around the plate. The drive rings also actuate an aperture mechanism which serves as a shutter. This reduces both the number of lenses and components needed to provide vibration compensation and autofocusing functions.

11 Claims, 6 Drawing Sheets

OPTICAL LENS BARREL WITH AN OPTICAL LENS GROUP SHIFTABLE PERPENDICULAR TO AND PARALLEL WITH AN OPTICAL AXIS AND METHOD OF USE

BACKGROUND OF THE INVENTION

1. Field of the Invention

The present invention relates to an optical lens barrel with a movable lens group, and more particularly to an optical lens barrel with a movable lens group shiftable in a direction perpendicular to the optical axis to compensate for vibrations and shiftable along the optical axis to obtain focus.

2. Description of the Related Art

It is known to equip cameras with an optical lens barrel having a vibration compensation mechanism which detects the amount of camera shake, resulting from, for example, hand shake, using, for example, a pair of angular velocity detection sensors, and thereafter drive a vibration compensation lens group perpendicular to the optical axis to compensate for the detected vibration. The vibration compensation mechanism is typically positioned near the vibration compensation lens group inside the lens barrel.

However, such cameras also require a focusing lens group for focus adjustment via movement along the optical axis. Associated focusing mechanisms, which drive the focusing lens group, are also required, and are typically separately situated in a conventional lens barrel. The resultant increase in the number of components inside the lens barrel dictates a larger lens barrel with higher costs. When the number of the lens groups inside the lens barrel becomes excessively large, the number and complexity of the lens holders must increase to ensure that the gaps and the tilt between the lens groups are precisely maintained. This, in turn, leads to even higher costs.

SUMMARY OF THE INVENTION

An object of the present invention is to provide a compact optical lens barrel with a minimum number of lens groups.

Another object of the present invention is to provide an economical optical lens barrel with a reduced number of lens groups.

A further object of the present invention is to provide a method for using a single lens group within an optical lens barrel to perform focusing and vibration compensation functions.

Another object of the present invention is to provide an optical lens barrel having a vibration compensation drive mechanism that displaces a vibration compensation lens group, which also constitutes the picture taking lens, in a direction perpendicular to the optical axis to prevent shaking of the photographed image, and a focusing mechanism which achieves focus by displacing the vibration compensation lens group along the optical axis direction.

Objects of the present invention are achieved in an optical lens barrel equipped with a vibration compensation lens group, which constitutes the picture taking lens, a vibration compensation drive mechanism which displaces the vibration compensation lens in a direction perpendicular to the optical axis to compensate for vibration of the photographed image, and a focusing mechanism which displaces the vibration compensation lens group along the optical axis to obtain focus.

Objects of the present invention are also achieved by an optical lens barrel equipped with a holding member, which holds a vibration compensation lens group so that it can be shifted in a direction which is perpendicular to the optical axis, a vibration compensation drive mechanism attached to the holding member, and a focusing mechanism which comprises a plurality of drive mechanisms to drive the holding member along the optical axis.

Objects of the present invention are further achieved by an optical lens barrel equipped with an aperture drive mechanism, which drives an aperture using part of a focusing mechanism.

Objects of the present invention are further achieved by an optical lens barrel comprising a first lens group having an optical axis, a vibration compensation unit which moves the first lens group perpendicular to the optical axis to compensate for vibrations in the optical lens barrel, and a focus mechanism which moves the first lens group along the optical axis to obtain a focus.

Objects of the present invention are also achieved by a camera comprising an optical lens barrel, a plate disposed within the optical lens barrel, a first lens group supported by the plate, the first lens group having an optical axis, a vibration compensation unit supported by the plate, the vibration compensation unit adapted to move the first lens group perpendicular to the optical axis to compensate for vibrations in the optical lens barrel, and a focus mechanism which moves the plate along the optical axis to obtain a focus.

Objects of the present invention are still further achieved by an optical lens barrel comprising a base, a threaded rod depending from the base parallel to an optical axis of the optical lens barrel, a nut threadably engaged with the threaded rod, a plate provided with an opening, the plate rotatably supporting the nut so as to move with the nut along the threaded rod, a first lens group movably supported by the plate, a vibration compensation unit supported by the plate, the vibration compensation unit adapted to move the first lens group to compensate for vibrations, a ring gear engaged with the nut, to drive the nut along the threaded rod, a focusing ring surrounding the hole in the plate and engaged with the ring gear, a drive ring inside the focusing ring, the drive ring engaging the focusing ring, an aperture activation ring rotatably disposed inside the drive ring and engaging the drive ring, a motor for rotating the drive ring through a driving motion in which the drive ring allows rotation of the focus ring thereby moving the plate parallel to the optical axis, an aperture motion in which the drive ring rotates the aperture activation ring, and a plurality of aperture blades engaged with the aperture activation ring, the blades being adapted to open and close in response to the rotation of the aperture activation ring.

Objects of the present invention are further achieved by a method of using an optical lens barrel comprising driving a lens group in the optical lens barrel along an optical axis to obtain focus, and driving the lens group on a plane perpendicular to the optical axis to compensate for vibrations in the optical lens barrel.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Figure 1:
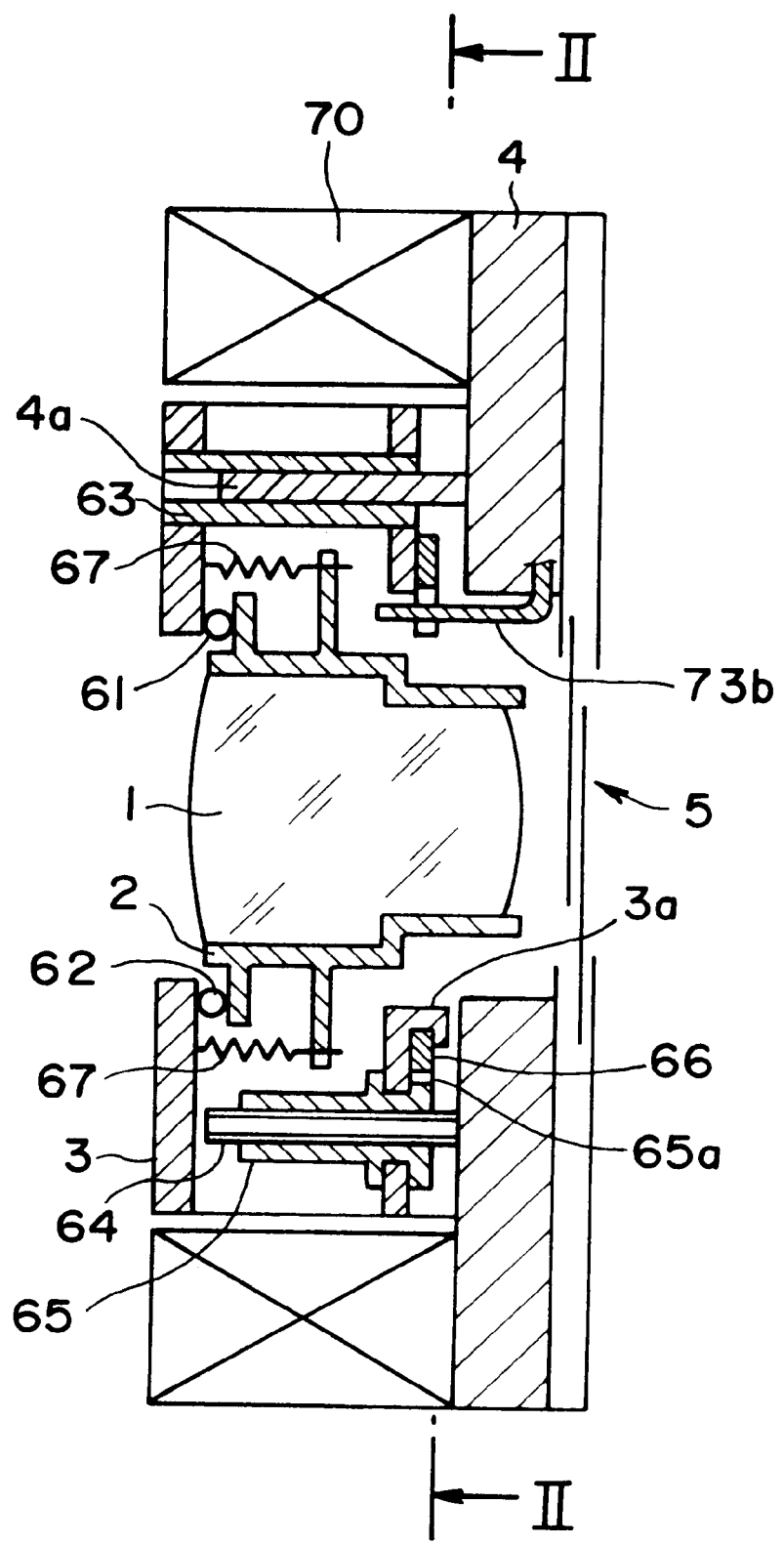
FIG. 1 is a cross-sectional view of an optical lens barrel in accordance with a first embodiment of the present invention.

FIG. 1 is a side cut-away view of an optical lens barrel in accordance with a first preferred embodiment of the present invention. A lens group 1, serving as a picture taking lens group and a vibration compensation lens group, comprises multiple lenses arranged along the same axis. A lens frame 2 holds the lens group 1 and is biased against a plate 3 by a series of springs 67 via four bearings including bearings 61 and 62. The lens frame 2, and therefore the lens group 1, can move perpendicular to the optical axis by rolling against the four bearings.

A plate 4 holds an aperture shutter 5 whose operation is described hereinafter. A guide shaft 4a, protrudes from the plate 4 and is slidably inserted through a sleeve 63. The sleeve 63 is attached to plate 3. A screw rod 64 protrudes from the plate 4 and is fixed in place. A nut 65, having a gear 65a attached around the circumference of its flange, is threadably screwed onto the screw rod 64. A ring gear 66, having a gear section 66a (see FIG. 2), is rotatably supported by a support section 3a of the plate 3. The gear section 66a is meshed with the gear 65a. An arm 73b is engaged with the ring gear 66.

The plate 4 holds a focusing driver 70, which drives the aperture shutter 5 and performs focusing as described hereinafter.

Figure 2:
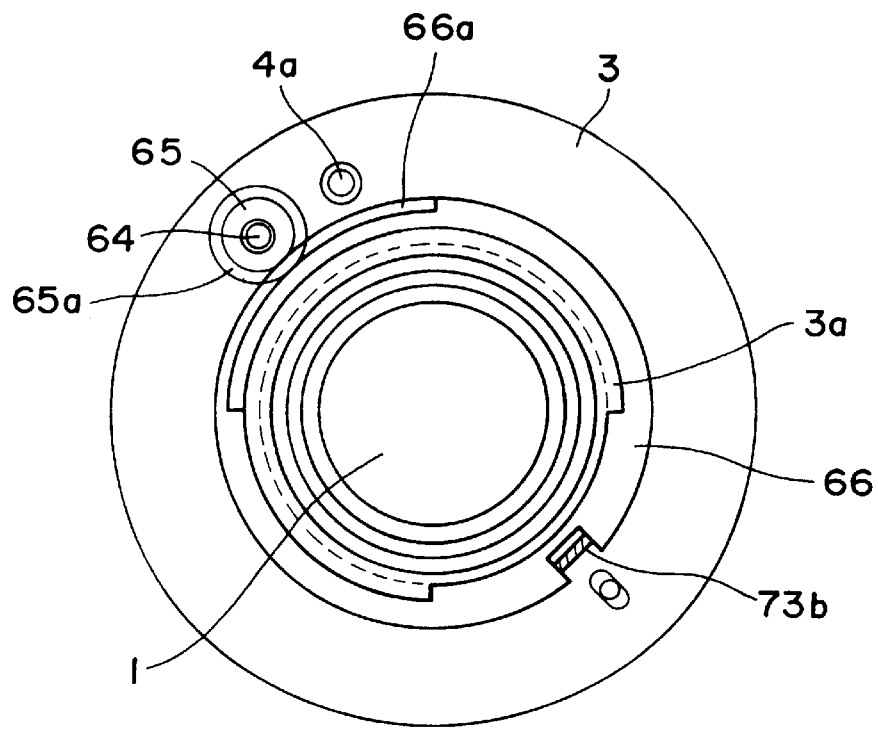
FIG. 2 is a cross-sectional view of the optical lens barrel of FIG. 1 taken along line II—II in FIG. 1.

FIG. 2 is a cut-away view of the lens barrel in accordance with the first preferred embodiment, taken along line II—II of FIG. 1, showing the relationship of the ring gear 66 and the gear 65.

Figure 3:
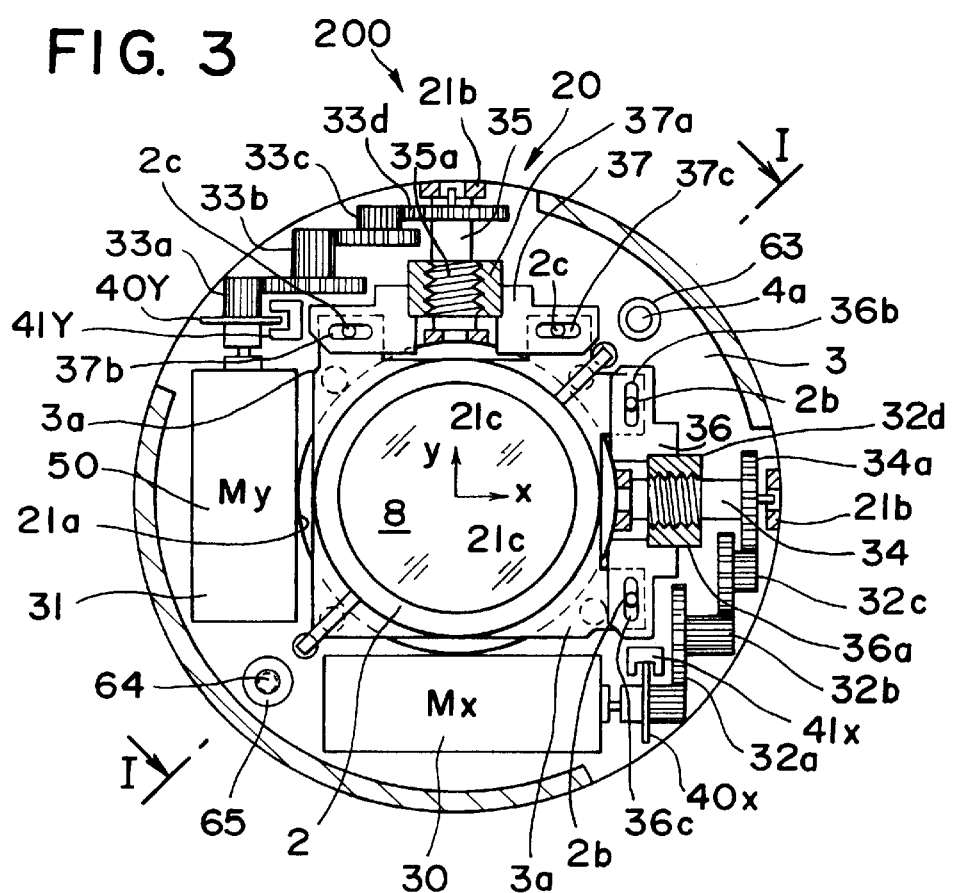
FIG. 3 is a cross-sectional view of the optical lens barrel in accordance with the first preferred embodiment showing the vibration compensation drive mechanism.

FIG. 3 is another cut-away view of the lens barrel in accordance with the first preferred embodiment of the present invention. A vibration compensation drive mechanism 200, attached to plate 3, drives the lens group 1 in a direction perpendicular to the optical axis. A pair of DC motors (Mx) 30 and (My) 50 are provided to shift the lens group 1 along the x-axis and the y-axis respectively. The driving force of the DC motors 30 and 50 are transmitted to a first shaft 34 and a second shaft 35, respectively, by a pair of rotation transmitting gear trains 32a~32d (x-axis) and 33a~33d (y-axis). The first shaft 34 and the second shaft 35, extend along the x-axis and the y-axis respectively, and are each supported by two pairs of shaft receiving sections 21b and 21c, which are rotatably positioned on the plate 3. The DC motors 30 and 50 are secured to the plate 3, and the two rotation transmitting gear trains 32a~32d and 33a~33d are configured so as to rotate in unison with the first shaft 34 and the second shaft 35, respectively.

A pair of linking members 36 (x-axis) and 37 (y-axis), having female screw sections 36a and 37a, respectively, are screwed into a pair of male screw sections 34a (x-axis) and 35a (y-axis) provided on the shaft 34 and the second shaft 35. A pair of slots 36b and 36c, which run parallel to the y-axis, are formed on the linking member 36 (x-axis). A pair of bosses 2b, positioned on a flange of the lens frame 2, fit into the slots 36b and 36c. A pair of slots 37b and 37c, are provided parallel to the x-axis on the linking member 37 (y-axis). A pair of bosses 2c, positioned on the flange of the lens frame 2, fit into the slots 37b and 37c.

The lens group 1 is driven in the x-axis direction by the linking member 36 which, in turn, is driven by the DC motor 30. The lens group 1 is likewise driven in the y-axis direction by the linking member 37 which, in turn, is driven by the DC motor 50. Thus, the lens group 1 can be driven to any location inside the opening of plate 3 by operation of the DC motors 30 and 50.

A pair of disks 40x and 40y, provided with holes, are attached as a unit to the gears 32a and 33a. The gears 32a and 33a are provided with multiple holes positioned at regular intervals around their perimeter. A pair of photo interrupters 41x and 41y are attached to the plate 3 such that they surround the perimeters of disks 40x and 40y. The photo interrupters 41x and 41y measure the angle of rotation of the DC motor 30 and the DC motor 50, along with the position of lens group 1 in the optical axis direction. That is, the photo interrupters 41x and 41y, output pulse signals based on the number of holes in disks 40x and 40y which pass by, allowing the lens position to be detected by counting the pulse signals.

Figure 4:
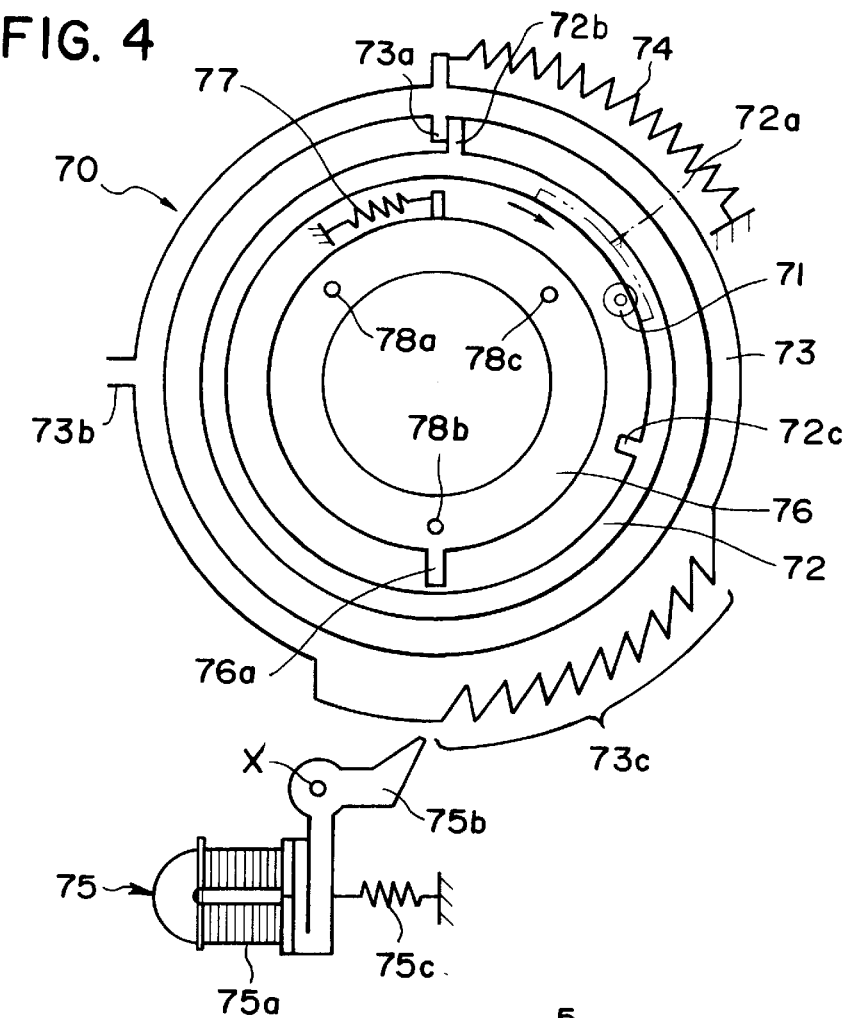
FIG. 4 is a diagram showing a focusing driver for the optical lens barrel in accordance with the first preferred embodiment of the present invention.

FIG. 4 is a cut-away view of the focusing driver 70 for use in the lens barrel according to the first preferred embodiment of the present invention. A stepping motor 120 (see FIG. 6), supported by the plate 4 (see FIG. 1), is provided to supply rotational force. The stepping motor 120 drives a pinion gear 71. The pinion gear 71 is meshed with a gear 72a, formed on the inner circumference of a drive ring 72. The drive ring 72 is rotated by the pinion gear 71 via the rotation of the stepping motor 120.

A limiter 72b is formed on the outer circumference of drive ring 72, such that it makes contact with a limiter 73a on the inner circumference of a focusing ring 73 which surrounds the drive ring 72. Bias is imparted to the focusing ring 73, in a clockwise direction, by an extension spring 74, causing the focusing ring 73 to follow the rotation of the drive ring 72 in a clockwise direction.

An arm 73b protrudes from the outer circumference of the focusing ring 73, and has a bent section (see FIGS. 1 and 2) which engages with the ring gear 66 (see FIG. 1). The ring gear 66 is rotated by the rotation of the focusing ring 73 via the arm 73b. The nut 65 (see FIG. 1) is likewise rotated by the rotation of ring gear 66. As the screw rod 64 (see FIG. 1) is fixed, the nut 65 moves parallel to the optical axis of the lens group 1 as it rotates about screw rod 64 driving the plate 3, the lens frame 2, and the lens group 1, in unison, along the optical axis to obtain focus.

A ratchet 73c is formed on the outer circumference of the focusing ring 73. A rotation stopping mechanism 75 stops the rotation of focusing ring 73 once focus is achieved. The rotation stopping mechanism 75 comprises a magnet 75a, a ratchet claw 75b which rotates around a shaft X, and a spring 75c biasing the ratchet claw 75b in a counterclockwise direction. When power from a power supply (not shown) is cut off from the magnet 75a, the ratchet claw 75b is held at the position shown in FIG. 4 by the energy imparted by the spring 75c. When power is supplied to the magnet 75a, the ratchet claw 75b is repulsed by the magnet 75a and rotates, in a counterclockwise direction, causing it to come into contact with the ratchet 73c of the focusing ring 73, thereby stopping the focusing ring 73.

After the focusing ring 73 is stopped, the drive ring 72 continues to rotate, and a limiter 72c protruding from the inner circumference of the drive ring 72, comes into contact with a limiter 76a of an aperture activation ring 76. The aperture activation ring 76 is biased in a counterclockwise direction by a spring 77. When the limiter 72c comes into contact with the limiter 76a, the aperture activation ring 76 rotates in a clockwise direction along with drive ring 72.

Figure 5:
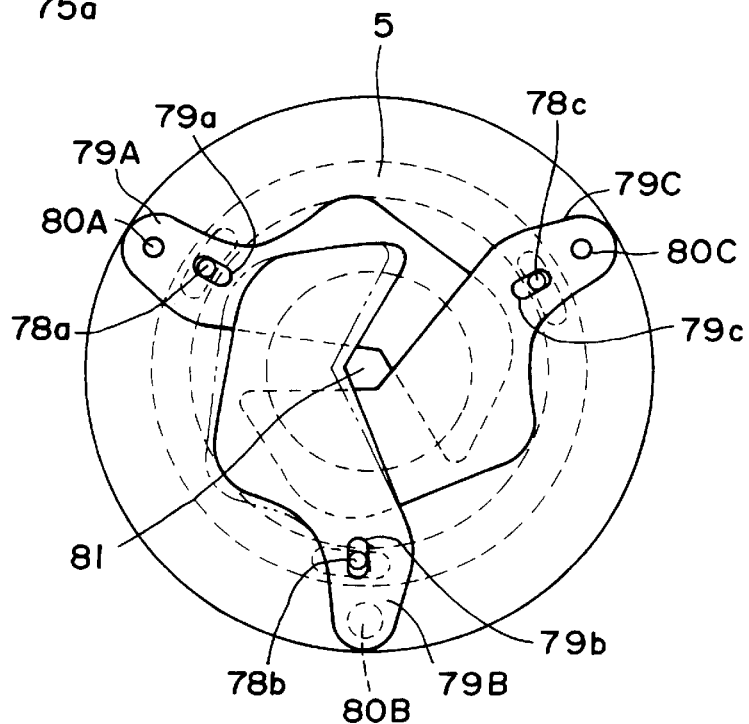
FIG. 5 is a diagram showing an aperture shutter driver in accordance with the first preferred embodiment of the present invention.

FIG. 5 is a cross sectional view of the aperture and shutter mechanism for use in the optical lens barrel according to the first preferred embodiment of the present invention. Pins 78a, 78b and 78c, embedded in the aperture activation ring 76, are inserted through slots 79a, 79b and 79c of sector blades 79A, 79B, and 79C which form an aperture shutter 5. When the aperture activation ring 76 (see FIG. 4) rotates, each of the sector blades 79A~79C are rotated around a set of three shafts 80A~80C by the aforementioned pins 78a~78c, causing the size of the aperture opening 81 to change, i.e. open or close.

Figure 6:
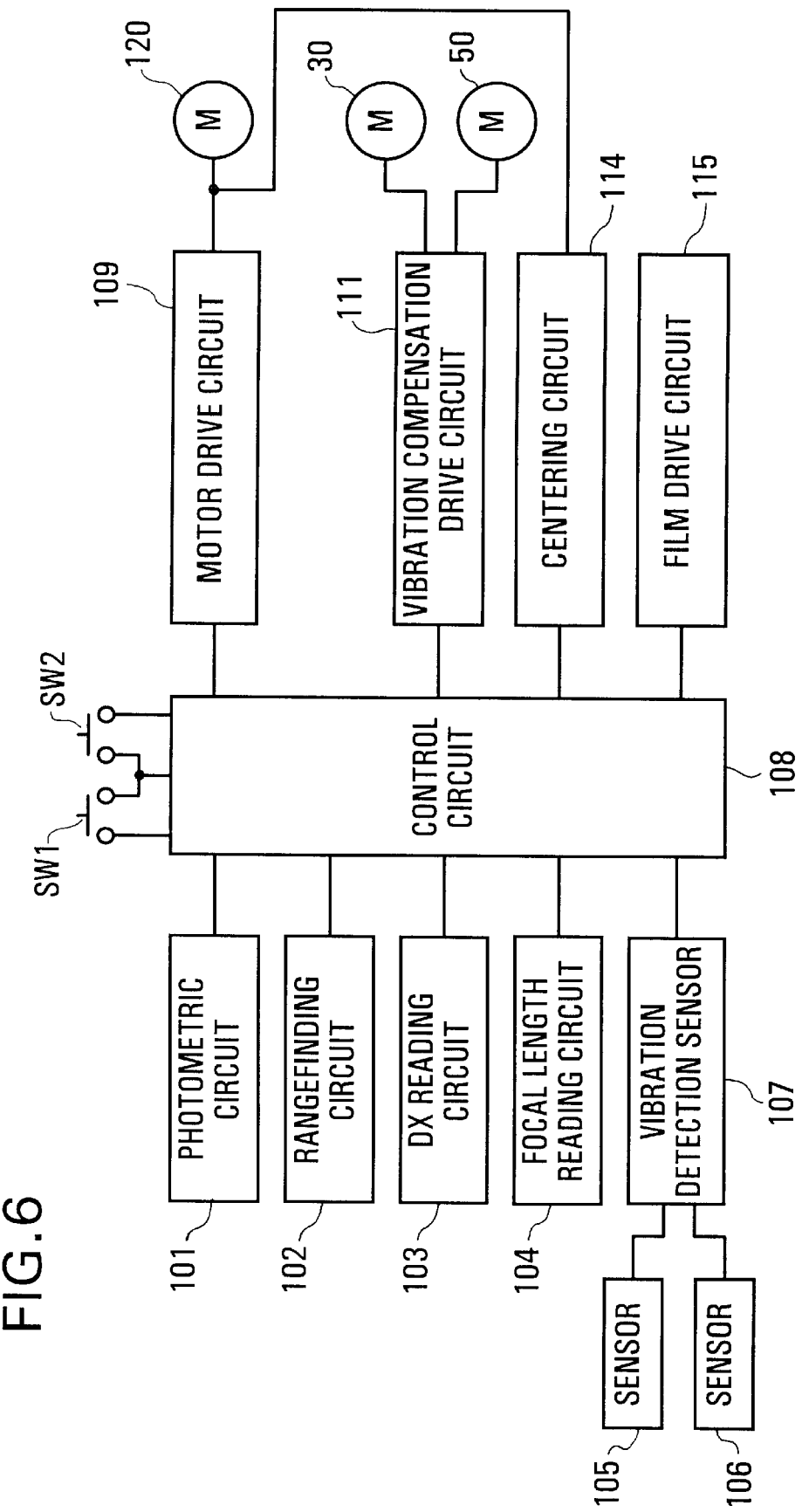
FIG. 6 is a block diagram of a control system for a camera equipped with the optical lens barrel in accordance with the first preferred embodiment of the present invention.

FIG. 6 is a block diagram of a control system for a lens shutter camera equipped with a lens barrel according to the first preferred embodiment of the present invention. A control circuit 108 is connected to a photometric circuit 101 for detecting subject brightness, a rangefinding circuit 102 to detect the distance to the subject, a DX reading circuit 103 to determine the ISO speed of the film, a focal length reading circuit 104 to determine the focal length of the optical lens barrel, a vibration detection circuit 107 to detect vibrations is the optical lens barrel, a motor drive circuit 109 for activating the stepping motor 120, a vibration compensation drive circuit 111 to compensate for vibrations in the optical lens barrel, a centering circuit 114, and a film drive circuit 115 to advance the film. The vibration detection circuit 107 is connected to an angular velocity sensor 105, which detects the amount of camera vibration parallel to the x-axis, and an angular velocity sensor 106, which detects the amount of camera vibration parallel to the y-axis. The vibration compensation drive circuit 111 is connected to the DC motor 30 and the DC motor 50. The centering circuit 114 drives lens group 1 to a center position, i.e. a position in which the optical axis of lens group 1 matches the axis of plate 3.

The control circuit 108 is also connected to a switch SW1, which comes on upon a half press of a release button (not shown), and a switch SW2, which comes on with the full press of the release button.

Figure 7:
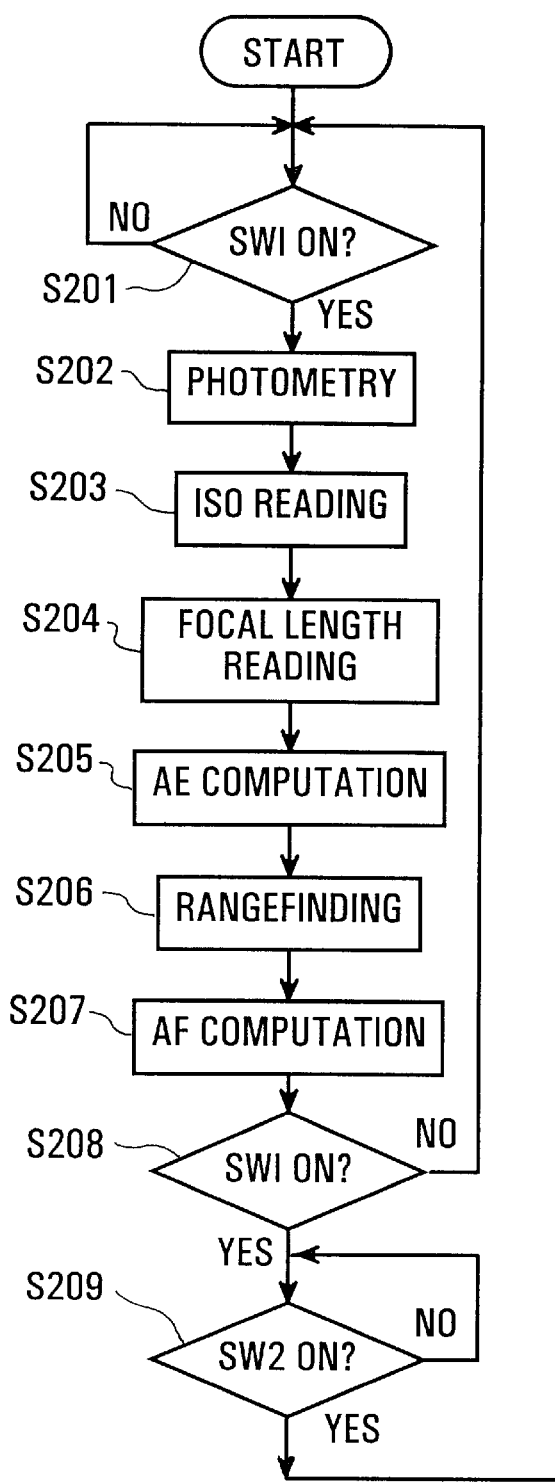
FIG. 7 is a flow chart which explains the operation of the optical lens barrel in accordance with the first preferred embodiment of the present invention.
Figure 7:
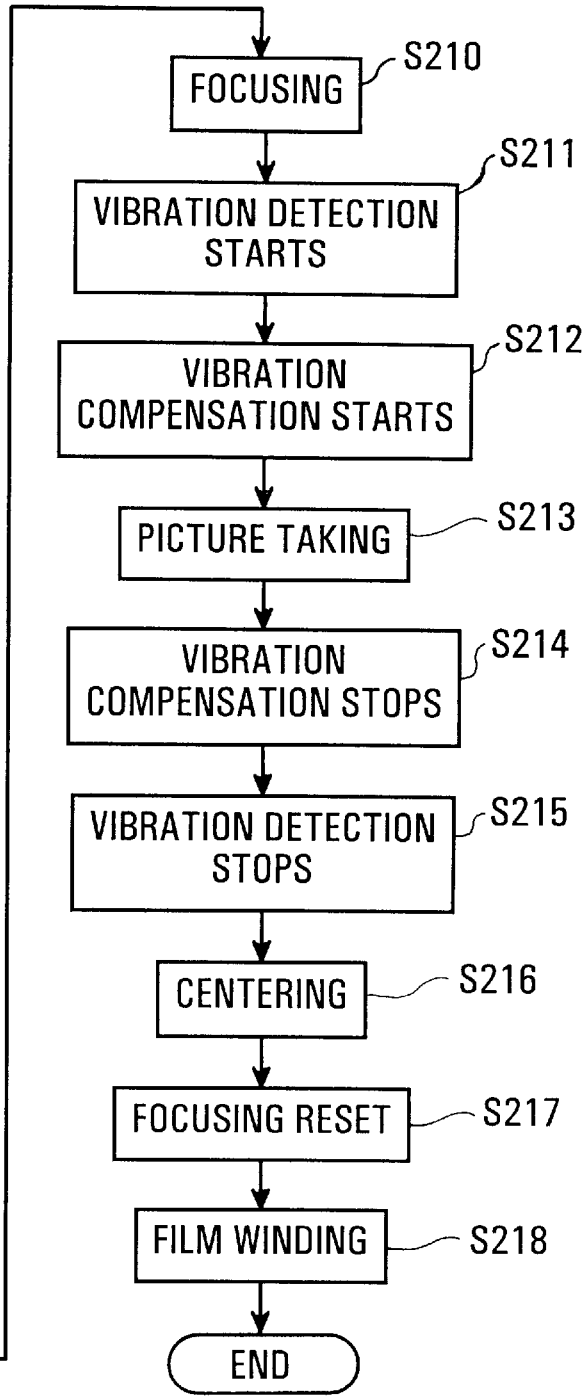

FIG. 7 is a flow chart of the operations performed by the control circuit 108.

Step S201 tests to determine if the switch SW1 is turned ON, by a half press of the release button. Once the switch SW1 is turned ON, the photometric circuit 101 is activated in step S202, and the subject brightness, is detected. Next, in step S203, the DX reading circuit 103 is activated and the ISO speed of the film is read. In step S204, the focal length of the optical lens barrel is detected by the focal length reading circuit 104.

In step S205, automatic exposure (AE) computation is performed based on the detected subject brightness and ISO speed of the film. Based on the results of the AE computation, an aperture value and a shutter speed, i.e. period, are set. Thereafter in step S206, the rangefinding circuit 102 is activated to determine the distance to the subject. In step S207, automatic focus (AF) computation is performed based on the detected subject distance to the subject, and the amount the lens group 1 needs to be driven to obtain focus is calculated.

Step S208 determines whether the switch SW1 is OFF, in which case the procedure returns to step S201, otherwise the procedure waits until the switch SW2 is turned ON in step S209. Thereafter, in step S210, the stepping motor 120 is driven by the motor drive circuit 109. The stepping motor 120 rotates the drive ring 72 in a clockwise direction via the pinion gear 71 (see FIG. 4). The focusing ring 73 rotates along with the drive ring 72. Thus, the plate 3 and the lens group 1 move along the optical axis, carrying the vibration compensating drive mechanism 200. When the lens group 1 reaches the specified focusing position (a position which corresponds to the computed drive amount for the lens group 1), the rotation stopping mechanism 75 (see FIG. 4) is operated and the focusing ring 73 and lens group 1 stops.

In step S211, the sensors 105 and 106 are actuated to start camera vibration detection. In step S212, the vibration compensation operation is started. That is, the x-direction motor 30 and the y-direction motor 50 are driven by an amount which corresponds to the output of sensors 105 and 106. Thus, the lens group 1 is driven parallel to the x-axis and y-axis, i.e. perpendicular to the optical axis, by the vibration compensation drive mechanism 200 (see FIG. 3).

In step S213, the stepping motor 120 continues to be driven and the aperture activation ring 76 is rotated via the drive ring 72. As a result, the blades 79A~79C, of the aperture shutter 5, are rotated around shafts 80A~80C via pins 78a~78c. By this rotation, the size of the aperture opening 81 changes. The stepping motor 120 is halted when the aperture opening 81 corresponds to the computed aperture value. Thereafter, the process pauses until the computed shutter period has elapsed, and the stepping motor 120 is reversed. This causes the drive ring 72 to be driven in reverse. The aperture activation ring 76 is driven in reverse by the spring 77, and the sector blades 79A~79C close.

In step S214, the x-direction DC motor 30 and y-direction DC motor 50 are stopped to halt the vibration compensation operation. In step S215, the vibration detection operation of sensors 105 and 106 is stopped. Thereafter, in step S216, the lens group 1 is returned to the center position by the centering circuit 114. In step S217, the power to magnet 75a is cut, causing the ratchet claw 75b to be pulled toward the magnet 75a, releasing ratchet 73c. The focusing ring 73 is pushed in reverse by the reversed drive gear 72, and the plate 3, along with lens group 1 and the vibration compensation drive mechanism 200 move along the optical axis direction to the original position.

Finally, in step S218, one frame of photographic film is wound by the film drive circuit 115 and processing is ended.

According to the first embodiment of the present invention, the lens group 1 acts as both a vibration compensation lens group and a focusing lens group inside the lens barrel, and precise adjustment of the gap between the lens groups becomes unnecessary. Therefore, the optical lens barrel remains compact and cost is reduced. Further, focusing is performed by driving the lens group 1 and the vibration compensation drive mechanism 200, in unison, along the optical axis such that focusing does not vary the positional relationship between lens group 1 and the vibration compensation drive mechanism 200, allowing the vibration prevention operation to be performed smoothly. Moreover, the drive source for focusing, i.e. the stepping motor 120, and also, part of the power transmission mechanism, are used to drive the aperture shutter thereby reducing the number of components.

Although the first embodiment of the present invention has been described with respect to a particular configuration for the optical lens barrel, it will be recognized that the first embodiment is not limited to the particular configuration and modification and changes are possible. For example, while a stepping motor 120 is described, an ultrasonic motor may also be used with appropriate modifications to the drive train. Further, while one motor drives both the sector blades and the lens group along the optical axis, one skilled in the art will recognize that two motors may be employed.

Figure 8:
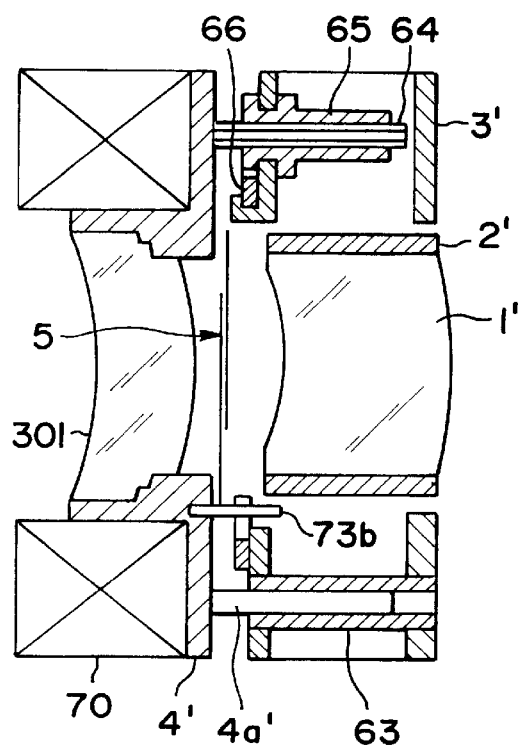
FIG. 8 is a cross-sectional diagram of an optical lens barrel in accordance with a second preferred embodiment of the present invention.

FIG. 8 is a cross sectional view of an optical lens barrel in accordance with a second preferred embodiment of the present invention in which an aperture shutter is arranged in front of the lens group.

Specifically and as embodied herein, a lens frame 2' holds a lens group 1' so that it can be shifted in the x and y directions within a plate 3'. A lens plate 4' holds a lens group 301 and the aperture shutter 5. A focus driver 70 is held on the outer circumference of the lens plate 4'.

A guide shaft 4a' protrudes from the lens plate 4' through a sleeve 63 attached to the plate 3'. A screw rod 64 protrudes from the plate 4' and is fixed in place. A nut 65 is screwed onto the screw rod 64 and is rotatably supported by the plate 3'. A ring gear 66 is meshed with a gear section on the end of the nut 65. An arm 73a (not shown) of a focusing ring 73 (not shown) fits into the ring gear 66, and moves the plate 3', in the optical axis direction, with respect to plate 4' to focus the lens group 1'.

Figure 9:
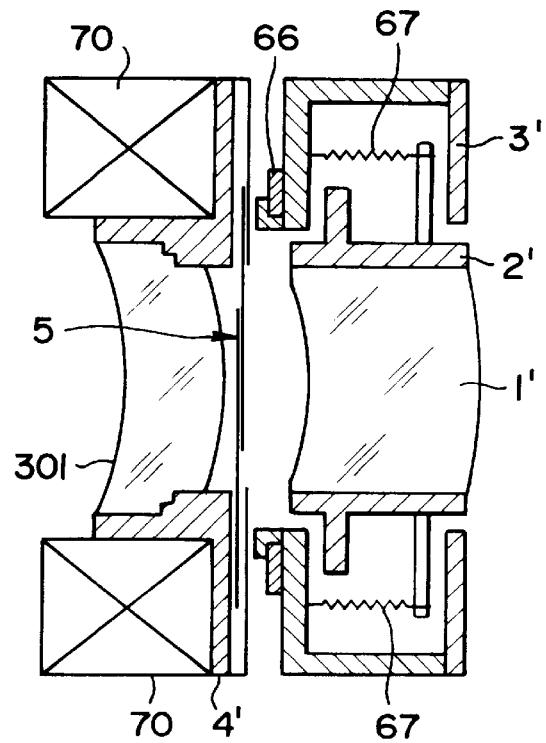
FIG. 9 is a cross-sectional diagram of an optical lens barrel as in FIG. 8, cut at a different angle.

FIG. 9 shows a cut-away view of the optical lens barrel in accordance with the second preferred embodiment of the present invention detailing how springs 67 bias the lens frame 2' against the plate 3'.

Figure 10:
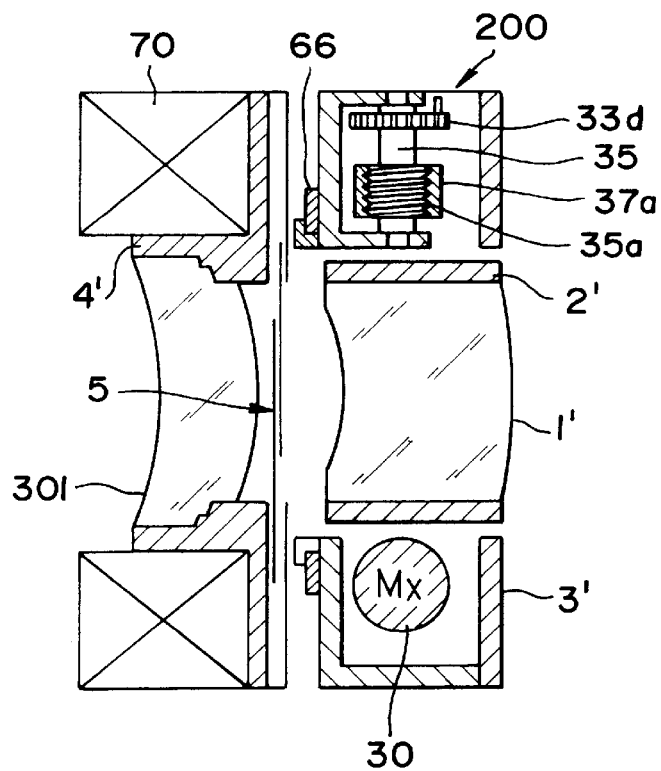
FIG. 10 is a cross-sectional diagram of an optical lens barrel as in FIG. 8 cut at a different angle.

FIG. 10 shows a cut-away view of the optical lens barrel in accordance with the second preferred embodiment of the present invention detailing the relationship of the vibration compensation drive mechanism 200 and the lens group 1'. The lens frame 2' can be moved in a direction perpendicular to the optical axis by a vibration compensation drive mechanism 200 as described hereinabove with reference to the first preferred embodiment. The focusing driver 70 is positioned adjacent to the vibration compensation drive mechanism 200 allowing the diameter of the lens barrel to be further reduced.

Although the second embodiment of the present invention has been described with respect to a particular configuration, it will be recognized that the second embodiment is not limited to the particular configuration and modifications and changes are possible. For example, while the lens barrel was described as having two lens groups 1 and 301, one skilled in the art will recognize that the lens group 301 is not needed. Further, the second embodiment of the present invention may also be applied to a lens barrel which uses three or more lens groups. Also, as set forth above, the lens barrel was described as being secured to a lens shutter camera, but one skilled in the art will recognize that the present invention may also be applied to an interchangeable lens in a single lens reflex camera.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An optical lens barrel comprising:

a first lens group having an optical axis;

a vibration compensation unit which moves said first lens group perpendicular to the optical axis to compensate for vibrations in the optical lens barrel; and a plate provided with an opening, said first lens group being biased against said plate within the opening and said plate supporting said vibration compensation unit;

a focus mechanism which moves said plate along the optical axis to obtain a focus, said focus mechanism comprising:

a base;

a threaded rod depending from said base;

a nut threadably engaged with said threaded rod, said nut rotatably supported by said plate, such that said nut can rotate about said threaded rod and linearly traverse said threaded rod thereby causing said plate to move along the optical axis;

a ring gear surrounding the opening in said plate, said ring gear engaged with said nut; and a motor which causes said ring gear to rotate thereby rotating said nut, causing said plate to move along said threaded rod.

2. An optical lens barrel, as set forth in claim 1, wherein:

said base is positioned behind said first lens group; and further comprising:

an aperture supported by said base, said aperture openable and closeable by said focus mechanism.

3. An optical lens barrel, as set forth in claim 1, further comprising:

an aperture positioned in front of said lens group.

4. An optical lens barrel, as set forth in claim 3, further comprising:

a second lens group positioned in front of said aperture.

5. An optical lens barrel, as set forth in claim 4, wherein said base supports said second lens group.

6. A camera comprising:

an optical lens barrel;

a plate disposed within said optical lens barrel, said plate provided with an opening;

a first lens group supported by said plate, said first lens group having an optical axis passing through the opening of said plate;

a vibration compensation unit supported by said plate, said vibration compensation unit adapted to move said first lens group perpendicular to the optical axis to compensate for vibrations in the optical lens barrel; and a focus mechanism which moves said plate along the optical axis to obtain a focus;

an aperture positioned in front of said first lens group, said aperture openable and closable by said focus mechanism; and a second lens group positioned in front of said aperture.

7. A camera, as set forth in claim 6, further comprising:

a support plate supporting said second lens group and said focus mechanism.

8. A camera, as set forth in claim 6, wherein said focus mechanism comprises:

a base;

a threaded rod depending from said base;

a nut threadable engaged with said threaded rod, said nut engaged by said plate such that said nut can rotate about said threaded rod and linearly traverse said threaded rod thereby causing said plate to move along the optical axis;

a ring gear surrounding the opening in said plate, said ring gear engaged with said nut; and a motor which causes said ring gear to rotate thereby rotating said nut, causing said plate to move along said threaded rod.

9. An optical lens barrel comprises:

a base;

a threaded rod depending from said base parallel to an optical axis of the optical lens barrel;

a nut threadably engaged with said threaded rod such that said nut can rotate about said threaded rod and linearly traverse said threaded rod along the optical axis;

a plate provided with an opening, said plate rotatably supporting said nut so as to move with the nut along the threaded rod;

a first lens group movably supported by said plate;

a vibration compensation unit supported by said plate, said vibration compensation unit adapted to move said first lens group to compensate for vibrations;

a ring gear, engaged with said nut, to drive said nut along said threaded rod;

a focusing ring surrounding the opening in said plate and engaged with said ring gear;

a drive ring inside said focusing ring, said drive ring engaging said focusing ring;

an aperture activation ring rotatably disposed inside said drive ring and engaging said drive ring;

a motor which causes said drive ring to rotate through a driving motion in which said drive ring allows rotation of said focus ring thereby moving said plate, parallel to the optical axis and an aperture motion in which the drive ring rotates said aperture activation ring; and a plurality of aperture blades engaged with said aperture activation ring, said blades being adapted to open and close in response to the rotation of said aperture activation ring.

10. A camera comprising:

an optical lens barrel;

a plate disposed within lens barrel, said plate provided with an opening;

a lens group supported by said plate, said lens group having an optical axis passing through the opening of said plate;

a vibration compensation unit supported by said plate, said vibration compensation unit adapted to move said lens group perpendicular to the optical axis to compensate for vibration in the optical lens barrel;

a focus mechanism which moves said plate along the optical axis to obtain focus; and an aperture positioned in front of said first lens group, said aperture openable and closable by said focus mechanism.

11. A lens barrel comprising:

a first plate disposed within lens barrel, said plate provided with an opening;

a lens group supported by said first plate, said lens group having an optical axis passing through the opening of said plate;

a focus mechanism disposed on a second plate supported by said first plate, said focus mechanism moves itself and said plate together along the optical axis to obtain focus; and a vibration compensation unit supported by said plate, said vibration compensation unit adapted to move said lens group perpendicular to the optical axis without to move said focus mechanism to compensate for vibration in the optical lens barrel.

* * * * *

UNITED STATES PATENT AND TRADEMARK OFFICE
CERTIFICATE OF CORRECTION

PATENT NO.: 5,930,042
DATED : July 27, 1999
INVENTOR(S): Hidenori Miyamoto, et al.

It is certified that error appears in the above-identified patent and that said Letters Patent is hereby corrected as shown below:

Column 10, line 34, (claim 10), after "said" insert --first--;
lines 36-37 (claim 10), change "without to move" to --without moving--.

Signed and Sealed this

Seventeenth Day of April, 2001

Attest:

NICHOLAS P. GODICI

Attesting Officer        Acting Director of the United States Patent and Trademark Office